United States Patent Office 2,716,593
Patented Aug. 30, 1955

2,716,593

STABILIZATION OF SULFUR TRIOXIDE WITH LIQUID SILICON COMPOUNDS

Irving Litant, Flushing, N. Y., and Robert V. Townend, Arlington, N. J., assignors to Allied Chemical & Dye Corporation, New York, N. Y., a corporation of New York No Drawing. Application December 4, 1952, Serial No. 324,131

19 Claims. (Cl. 23—174)

This invention relates to the stabilization of liquid sulfur trioxide (substantially pure $SO_3$) and high strength oleums.

At room temperature, liquid sulfur trioxide polymerizes to various degrees. The three generally recognized $SO_3$ modifications melt at approximately 17° C., 32.5° C., and 62° C., respectively. On standing at temperature below about 27° C., in the presence of even small amounts of moisture, the form melting at about 17° C. rapidly polymerizes to the higher melting forms, the mass soon becomes solid, and melts only under pressure, sometimes requiring temperatures up to 100° C. to effect complete liquefaction. High strength oleums of free $SO_3$ strengths upward of about 80% tend to polymerize in similar fashion, the degree of polymerization depending chiefly upon the $SO_3$ strength of the oleum and temperatures at which the material is stored. In oleums of the lower portions of the $SO_3$ strength range indicated, certain polymers form, the degree of polymerization increases on passage of time, and while the material may not solidify completely, the ultimate mass may be a liquid phase containing in suspension the various solid polymers noted.

In many industrial processes, it is highly desirable to use $SO_3$ in its strongest obtainable form. However, the foregoing characteristics of sulfur trioxide and high strength oleums create marked disadvantage relative to the storage, shipment, and use of such materials. While, for example, sulfur trioxide might be shipped in drums equipped with heating coils, there is involved the first problem of supplying a relatively expensive form of container. Moreover, since heat transfer through a solid material is poor, the solidified sulfur trioxide in the container can be melted by the user only with considerable difficulty. In addition to this disadvantage, after relatively long periods of standing, a large portion of the sulfur trioxide will have polymerized to the high melting form in which case complete melting can only be effected by heating at high temperature under considerable pressure. To a degree, the same disadvantages apply to high strength oleums.

This invention aims to provide stabilized forms of liquid sulfur trioxide or high strength oleums which either do not polymerize to any substantial degree and remain liquid at room temperature, or in which, if polymerization does take place, the polymers formed are readily meltable at moderate temperatures of about 40° C. and below, i. e. temperatures which do not require substantial vaporization of $SO_3$ or use of heating containers capable of withstanding relatively high pressures, as is the case when high temperatures are needed to melt the more refractory types of polymers. The invention also affords methods for accomplishing the foregoing objectives. A further object of the invention is to provide stabilizing agents which are effective in small concentrations, in inhibiting polymerization of $SO_3$ and are easily dispersed in stabilizing quantities in liquid sulfur trioxide and high strength oleums. A further object is to produce stabilized liquid $SO_3$ free of char or other colored products of organic nature.

This invention comprises stabilizing liquid sulfur trioxide against polymerization by the addition of a saturated monomeric silicon compound of the general formult X—M—Y, wherein X is at least one of the substances selected from the group consisting of chlorine, fluorine, the methyl group, and the methoxy group, M is selected from the group consisting of the silicon atom (the monosilane nucleus) and the fully X and Y substituted disiloxane nucleus, and Y is at least one of the substances selected from the group consisting of $Cl_a$, $F_a$, $(CH_3)_b$, and $(OCH_3)_b$, $a$ being an integer from 0 to 3 which is 0 when M is the silicon atom and $b$ being an integer from 0 to 3, which is 0, 1 or 2 when M is the disiloxane nucleus, and wherein all otherwise unsatisfied silicon valence bonds are satisfied by hydrogen. With the exceptions noted for substituents in the Y position of the above formula, the number of X or Y substituents will be 1, 2 or 3. When M is the silicon atom or the disiloxane group, the total numbers of substituents will not exceed four or six respectively, these substituents being selected from X, Y and hydrogen. Although the number of hydrogen, chlorine, or fluorine atoms present, or the sum of them, may be three when M is the silicon atom, preferred stabilizers in this class (which may be designated as having the formula X—Si—Y), include those containing at least two and up to four methyl or methoxy groups, because their higher boiling points favor their incorporation in liquid form and at low pressure into the liquid $SO_3$. Tetramethyl silane or tetramethoxy silane, being liquid at ordinary temperature, may be incorporated into the $SO_3$ at atmospheric pressure. Other silanes having satisfactorily high boiling points include trimethyl silane, trimethyl methoxy silane, and methyl trichloro silane.

With respect to the class of compounds contemplated by the invention, in which M of the noted formula is characterized as the disiloxane group, a large number of these compounds are ordinarily liquid, and hence adapted to be incorporated into $SO_3$ liquid at atmospheric or low pressures. Among the members of the class X—SiOSi—Y, the perhalogenated disiloxanes (e. g. $Cl_3SiOSiCl_3$) are excellent stabilizers which may be incorporated into the $SO_3$ at atmospheric pressure.

The preferred treating agents are compounds having boiling points above or only slightly below room temperature. Stabilizing agents used in practice of the invention may be readily dispersed throughout liquid $SO_3$ in small quantities, by adding the selected material to the $SO_3$ liquid and mixing at ordinary temperatures. Pressures used may be atmospheric, or higher if the stabilizer is ordinarily a gas. The novel stabilized liquid sulfur trioxide product is formed by the addition of only small qantities of the selected treating agent, usually 0.5% or less by weight of $SO_3$ present. Satisfactory stabilization may be obtained in many if not most instances with amounts of stabilizer of the order of 0.05% to 0.2% by weight of $SO_3$. When the proper amount of stabilizer has been added to the $SO_3$ liquid, the mixture is capable of being handled for extended periods without the production of deleterious amounts of high-melting polymers. Such mixtures contain no more than 1%–2% polymer, and retain the ability to be completely or substantially completely melted after repetitious freezings and melting.

Since anhydrous sulfur trioxide tends to polymerize at a slower rate than does sulfur trioxide containing water (i. e. chemically combined in the form of $H_2SO_4$), and since, from a commercial point of view, it is advantageous to manufacture, store and ship sulfur trioxide as such (in substantially anhydrous form) or as an oleum containing at least about 99.4% free $SO_3$, particular embodiments of my invention are directed to stabilization of these high $SO_3$ content materials.

The quantity of treating agent employed depends largely upon the degree of stabilization desired and the amount of water present in the material. In general, the larger the amount of agent added, the greater is the stabilizing effect thereof; and, considering anhydrous sulfur trioxide (containing substantially no water) as a starting point, the greater the amount of water (up to approximately 0.1% by weight), the greater is the tendency for $SO_3$ polymers to form, and the greater will be the amount of stabilizer required to effect a given degree of stabilization.

It is usually desirable to avoid the dilution of the sulfur trioxide and to maintain the strength at the maximum value possible. Therefore, it is preferred to utilize treating material in amount equivalent to less than 1% by weight, the latter quantity being generally appreciably more than adequate to effect desired stabilization of sulfur trioxide or high strength oleums. Overall results are not significantly better when the stabilizing agents of the invention are used in quantities in excess of the small percentages by weight as herein set forth.

The following examples illustrate the practice of my invention, the parts and percentages being by weight:

*Example I.*—0.05% by weight of methyl silicate $(CH_3O)_4Si$ was added to 20 grams of freshly distilled anhydrous liquid sulfur trioxide and the mixture was mildly agitated at substantially room temperature. The resulting mixture was stored at 0° C. and warmed to room temperature at intervals to melt the frozen crystals of $SO_3$. It was observed that after 9 remeltings over a period of 8 weeks that only about 1% polymer (unmelted crystals) was present.

*Example II.*—0.10% by weight of methyl silicate was added to 20 grams of anhydrous liquid sulfur trioxide and the resulting mixture was further tested according to the procedure of Example I. After 9 remeltings in 9 weeks 0% polymer was observed.

*Example III.*—0.50% by weight of methyl silicate was added to 20 grams of anhydrous liquid sulfur trioxide and the resulting mixture was further tested according to the procedure of Example I. After 2 remeltings in 1 week, 1% polymer was observed. After 9 remeltings in 8 weeks, 2% polymer was observed.

*Example IV.*—0.2% by weight of hexachlorodisiloxane $(Cl_3SiOSiCl_3)$ was added to 20 grams of anhydrous liquid sulfur trioxide and the resulting mixture was further tested according to the procedure of Example I. After 4 remeltings over a period of 22 days, 5% polymer was observed, there being only about 1% polymer after 2 remeltings in 1 week.

*Example V.*—0.1% by weight of methyl trichlorosilane $(CH_3SiCl_3)$ was added to 20 grams of freshly distilled anhydrous liquid sulfur trioxide and the resulting mixture was further tested according to the procedure of Example I. After 4 remeltings over a period of 22 days, 2% polymer was observed.

When employing the compounds set forth in the specific examples, it is found for example that most favorable results are obtained with methyl silicate when this compound is present in the range of 0.05 to 0.5% by weight, and with hexachlorodisiloxane and methyl trichlorosilane in concentrations of 0.05% to 0.2% by weight. There is however no detrimental effect if an excess of stabilizer has been added, since these compounds which are liquid can be readily flushed out of the container from which the $SO_3$ has been vaporized.

The preferred products of the invention, i. e. the inhibited sulfur trioxide or oleums of $SO_3$ strength at least about 99.4% by weight, which do not polymerize to any appreciable extent, preferably should be kept sealed off from contact with air, since a small amount of moisture may cause such products to lose some stability and to form polymers.

Although stabilization of sulfur trioxide may be effected over a wide range of $SO_3$ content highly efficacious results are obtained with small quantities of stabilizer when the amount of water in the $SO_3$ is less than 0.1% of water by weight or its equivalent 0.56% of sulfuric acid. Under these conditions, the stabilized liquid sulfur trioxide may be stored for long periods without substantial polymerization.

The sulfur trioxide or oleum to be treated may be obtained from any suitable source. For example, substantially 100% $SO_3$ may be obtained by distilling say 30% oleum under conditions to avoid vaporization of $H_2SO_4$, and condensing the $SO_3$ at temperature, say 20–30° C., at which liquid sulfur trioxide has sufficiently low vapor pressure. Similarly, liquid sulfur trioxide may be obtained from the dry mist-free say 10%, $SO_3$ exiting from a catalytic $SO_2$ oxidation operation, by compressing the gas to about 160–170 lbs. per square inch, and cooling the compressed gas to 20–25° C., under which conditions about 70% of the $SO_3$ may be liquefied and recovered as substantially 100% liquid sulfur trioxide.

While we do not intend to limit ourselves to any particular theory, we believe that the stabilizers of this invention when added to the oleum or liquid sulfur trioxide, form dispersions or solutions of active stabilizing agent in the material stabilized. The ease of incorporation and dispersion of inhibitor in the oleum or sulfur trioxide affords the marked advantage of the present invention in that no further processing of the mixed $SO_3$ material and stabilizing agent is required.

The treating agent used may be added directly to the liquid to be stabilized and dispersed therethrough by agitation, or in the case of stabilizing substantially 100% sulfur trioxide, the vaporous $SO_3$ conveniently may be condensed in a closed vessel in which the treating material to be used has been previously placed.

We claim:

1. The method of stabilizing material of the group consisting of liquid sulfur trioxide and oleum of $SO_3$ strength such that $SO_3$ polymers tend to form, which method comprises incorporating therewith in amount sufficient to stabilize said material but less than 1% by weight of the free $SO_3$ content thereof, a monomeric compound of the formula X—M—Y, wherein X is at least one of the substances selected from the group consisting of chlorine, fluorine, methyl, and methoxy, M is selected from the group consisting of the silicon atom and the fully X and Y substituted disiloxane nucleus, and Y is at least one of the substances selected from the group consisting of $Cl_a$, $F_a$, $(CH_3)_b$, and $(OCH_3)_b$, $a$ being an integer from 0 to 3 which is 0 when M is the silicon atom and $b$ being an integer from 0 to 3 which is 0, 1 or 2 when M is the disiloxane nucleus, the otherwise unfilled valence bonds of the silicon atoms in the molecule being filled by hydrogen atoms.

2. The method of stabilizing material of the group consisting of liquid sulfur trioxide and oleum of $SO_3$ strength such that $SO_3$ polymers tend to form, which method comprises incorporating therewith in amount sufficient to stabilize said material but less than 1% by weight of the free $SO_3$ content thereof, a monomeric compound of the formula X—Si—Y wherein X is at least one of the substances selected from the group consisting of chlorine, fluorine, methyl, and methoxy, and Y is at least one of the substances selected from the group consisting of $(CH_3)_b$ and $(OCH_3)_b$, $b$ being an integer from 0 to 3, the otherwise unfilled valence bonds of the silicon atom in the molecule being filled by hydrogen atoms.

3. The method of stabilizing material of the group consisting of liquid sulfur trioxide and oleum of $SO_3$ strength such that $SO_3$ polymers tend to form, which method comprises incorporating therewith in amount sufficient to stabilize said material but less than 1% by weight of the free $SO_3$ content thereof, a monomeric compound of the formula X—SiOSi—Y wherein X and Y are each at least one of the substances selected from the group consisting of chlorine and fluorine, the otherwise unfilled valence bonds of the silicon atoms in the molecule being filled by hydrogen atoms.

4. The method of stabilizing material of the group consisting of liquid sulfur trioxide and oleum of $SO_3$ strength such that $SO_3$ polymers tend to form, which method comprises incorporating therewith in amount sufficient to stabilize said material and within the range of 0.05 to 0.2% by weight of the free $SO_3$ content thereof, hexachlorodisiloxane.

5. The method of stabilizing material of the group consisting of liquid sulfur trioxide and oleum of $SO_3$ strength such that $SO_3$ polymers tend to form, which method comprises incorporating therewith in amount sufficient to stabilize said material and within the range of 0.05 to 0.2% by weight of the free $SO_3$ content thereof, methyl trichlorosilane.

6. The method of stabilizing material of the group consisting of liquid sulfur trioxide and oleum of $SO_3$ strength such that $SO_3$ polymers tend to form, which method comprises incorporating therewith in amount sufficient to stabilize said material and within the range of 0.05 to 0.5% by weight of the free $SO_3$ content thereof, methyl silicate.

7. In stabilizing against polymerization free $SO_3$ in high $SO_3$ content materials from the group consisting of liquid sulfur trioxide and oleums of $SO_3$ strength such that $SO_3$ polymers tend to form, the process of incorporating with said material in small amount sufficient to stabilize the same but insufficient to dilute substantially its free $SO_3$ content, a monomeric compound of the formula X—M—Y, wherein X is at least one of the substances selected from the group consisting of chlorine, fluorine, methyl, and methoxy, M is selected from the group consisting of the silicon atom and the fully X and Y substituted disiloxane nucelus, and Y is at least one of the substances selected from the group consisting of $Cl_a$, $F_a$, $(CH_3)_b$, and $(OCH_3)_b$, $a$ being an integer from 0 to 3 which is 0 when M is the silicon atom and $b$ being an integer from 0 to 3 which is an integer from 0 to 2 when M is the disiloxane nucleus, the otherwise unfilled silicon valence bonds in the molecule being filled by hydrogen atoms.

8. In stabilizing against polymerization free $SO_3$ in high $SO_3$ content materials from the group consisting of liquid sulfur trioxide and oleums of $SO_3$ strength such that $SO_3$ polymers tend to form, the process of incorporating with said material, in small amount sufficient to stabilize the same but insufficient to dilute substantially its $SO_3$ content, hexachlorodisiloxane.

9. In stabilizing against polymerization free $SO_3$ in high $SO_3$ content materials from the group consisting of liquid sulfur trioxide and oleums of $SO_3$ strength such that $SO_3$ polymers tend to form, the process of incorporating with said material, in small amount sufficient to stabilize the same but insufficient to dilute substantially its $SO_3$ content, methyl trichlorosilane.

10. In stabilizing against polymerization free $SO_3$ in high $SO_3$ content materials from the group consisting of liquid sulfur trioxide and oleums of $SO_3$ strength such that $SO_3$ polymers tend to form, the process of incorporating with said material, in small amount sufficient to stabilize the same but insufficient to dilute substantially its $SO_3$ content, methyl silicate.

11. A liquid composition containing free polymerization-resistant sulfur trioxide in polymerizable concentration comprising a material selected from the group consisting of sulfur trioxide and oleum of $SO_3$ strength such that polymers tend to form to which has been added a monomeric liquid stabilizing agent having the formula X—M—Y, wherein X is at least one of the substances selected from the group consisting of chlorine, fluorine, methyl, and methoxy, M is selected from the group consisting of the silicon atom and the fully X and Y substituted disiloxane nucleus, and Y is at least one of the substances selected from the group consisting of $Cl_a$, $F_a$, $(CH_3)_b$, and $(OCH_3)_b$, $a$ being an integer from 0 to 3 which is 0 when M is the silicon atom, and $b$ being an integer from 0 to 3 which is an integer from 0 to 2 when M is the disiloxane nucleus, the otherwise unfilled silicon valence bonds in the molecule being filled by hydrogen atoms.

12. Composition as set forth in claim 11, in which the addition agent is less than 1% by weight of the free $SO_3$ content of said material.

13. A liquid composition containing free polymerization-resistant $SO_3$ in polymerizable concentration and less than 0.1% water comprising a material selected from the group consisting of sulfur trioxide and oleum of $SO_3$ strength such that polymers tend to form, to which has been added from about 0.05% to about 0.5% by weight of the free $SO_3$ content of said material, a stabilizing agent selected from the group consisting of hexachlorodisiloxane, methyl trichlorosilane, and methyl silicate.

14. A liquid composition containing free polymerization-resistant sulfur trioxide in polymerizable concentration comprising a material selected from the group consisting of sulfur trioxide and oleum of $SO_3$ strength such that polymers tend to form, to which has been added hexachlorodisiloxane.

15. A liquid composition containing free polymerization-resistant sulfur trioxide in polymerizable concentration comprising a material selected from the group consisting of sulfur trioxide and oleum of $SO_3$ strength such that polymers tend to form, to which has been added from about 0.05% to about 0.2% hexachlorodisiloxane by weight of the free $SO_3$ content of said material.

16. A liquid composition containing free polymerization-resistant sulfur trioxide in polymerizable concentration comprising a material selected from the group consisting of sulfur trioxide and oleum of $SO_3$ strength such that polymers tend to form, to which has been added methyl trichlorosilane.

17. A liquid composition containing free polymerization-resistant sulfur trioxide in polymerizable concentration comprising a material selected from the group consisting of sulfur trioxide and oleum of $SO_3$ strength such that polymers tend to form, to which has been added from about 0.05% to about 0.2% methyl trichlorosilane by weight of the free $SO_3$ content of said material.

18. A liquid composition containing free polymerization-resistant sulfur trioxide in polymerizable concentration comprising a material selected from the group consisting of sulfur trioxide and oleum of $SO_3$ strength such that polymers tend to form, to which has been added methyl silicate.

19. A liquid composition containing free polymerization-resistant sulfur trioxide in polymerizable concentration comprising a material selected from the group consisting of sulfur trioxide and oleum of $SO_3$ strength such that polymers tend to form, to which has been added from about 0.05% to about 0.5% methyl silicate by weight of the free $SO_3$ content of said material.

References Cited in the file of this patent

UNITED STATES PATENTS

| Number | Name | Date |
|---|---|---|
| 794,581 | Bachrach | July 11, 1905 |
| 2,386,441 | Daudt | Oct. 9, 1945 |
| 2,437,204 | McGregor et al. | Mar. 2, 1948 |
| 2,459,387 | McGregor et al. | Jan. 18, 1949 |
| 2,469,888 | Patnode | May 10, 1949 |

OTHER REFERENCES

Post Silicones and Other Organic Silicon Compounds, Reinhold Publishing Corporation, New York 18, N. Y., 1949, pages 33, 34 and 59.